UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

INSULATING COMPOSITION.

1,216,265. Specification of Letters Patent. Patented Feb. 20, 1917.

No Drawing. Application filed October 17, 1913. Serial No. 795,779.

*To all whom it may concern:*

Be it known that I, LEO H. BAEKELAND, a citizen of the United States, residing at Yonkers, in the county of Westchester and State of New York, have invented certain new and useful Improvements in Insulating Compositions, of which the following is a specification.

This invention relates to more or less fluid or mobile compositions containing phenolic condensation products, particularly such as are transformable by simple heating to the infusible state, in which state they may however retain under some conditions a marked degree of elasticity, particularly at higher temperatures.

It is now well understood in the art that there exist two well-defined groups of phenolic condensation products, viz., those which are initially soluble and fusible but which are transformed by simple heating to infusible bodies, passing in the course of such transformation through an intermediate state in which they are plastic but infusible, and gelatinized by certain organic liquids but insoluble therein; and those which are permanently fusible and soluble in various solvents, particularly in the presence of free phenols. It is also known that the products of the second group, which have been variously designated as saliretins or saliretin-resins, novolak, shellac substitutes, phenol resins, etc., and which in their properties more closely approximate the natural resins, may be transformed by the action of formaldehyde, or other bodies containing a mobile methylene group, into the products of the first group. (See U. S Patents 1,038,475 to L. H. Baekeland, 1,020,593 to J. W. Aylsworth, Belgian Patent 204,811 to Knoll.)

My invention relates particularly to the preparation of solutions of initial condensation products of the first group, the object of the invention being to prepare solutions which neither contain, in any material proportion, nor yield by reaction, bodies such as water, ammonia, methyl or ethyl alcohol, acetone, water soluble bodies, or substances which attract or retain ammonia or water, acid-reacting substances, or the like, or in general any substance which would lessen the value of the solution, or of the product obtained by hardening the same, for electrical insulating purposes, particularly where high-frequency alternating currents are involved. In the preferred embodiment of the invention, I utilize in the preparation of such solutions or compositions a novel phenolic condensation product, which prduct and the method of preparing the same, are claimed in a copending application Serial No. 776,847, filed July 1, 1913, by Baekeland and Gotthelf.

One composition in accordance with the present invention may be prepared as follows:—

I incorporate with a suitable solvent preferably having the characteristics hereinafter pointed out, suitable proportions of a fusible phenolic resin (a fusible phenolic condensation product of the second group above referred to) and of anhydro-formaldehyde-anilin. These reacting components may be added to the solvent either separately or mixed together, or they may be melted or sintered together before being introduced into the solvent. In any case, the resulting mixture is heated to a degree sufficient to obtain a good solution. In ordinary practice, the proportion of anhydro-formaldehyde-anilin to 100 parts of the fusible phenolic resin may vary from 20 to 200 parts. The proportion of these combined ingredients to the solvent may vary within wide limits up to complete saturation according to the use to which the solution is to be applied.

Anhydro-formaldehyde-anilin possesses mobile methylene groups, and is hence capable of converting the fusible phenol resins of the second group into the products of the first group, which latter upon sufficient heating are transformed into infusible bodies. The particular advantage possessed by anhydro-formaldehyde-anilin in this reaction resides in the fact that in contradistinction to all such methylene-containing bodies as formaldehyde, its polymers and hydrates, the methylene amins, including hexamethylenetetramin, methylene combinations with halogens, alcohol groups, acid radicals, etc., it liberates no gaseous or readily volatile by-product in the reaction involved in the transformation of the fusible resin of the second group to the infusible product of the first group. This fact is particularly advantageous in the case of products intended for the insulation of high frequency alternating currents, where even the smallest traces of water, ammonia, substances which retain water or ammonia, or are soluble in water, acid-reacting substances, etc., are highly prejudicial. It is hence highly desirable to provide a solvent which will not detract from the value of the product as an insulator. For this purpose therefore the choice of a proper solvent is restricted to bodies-possessing the following characteristics, viz.:

(1) The capacity of dissolving the initial condensation product without the addition or presence of free phenol or cresol, methyl or ethyl alcohol, acetone, esters, nitrobenzol, etc., or of other compounds of lower insulating value than the solvent itself;

(2) Lack of affinity for water as evidenced by substantial immiscibility therewith;

(3) High insulating value, for high tension alternating currents, and freedom from any too pronounced tendency to become heated under the action of such currents.

A satisfactory solvent having these characteristics is so-called "neutral oil," which is understood to be a high-boiling-point distillate from gas tar, freed by treatment with acids and caustic alkalis from "tar acids" and bases, such as phenol, cresol, ammonia, pyridin, or the like, and containing in varying proportions certain high-boiling cyclic hydrocarbons. Other appropriate solvents for electrical purposes are for instance, mono-chlor-naphthalene, tetrachlorethan (boiling point about 147° C.), chloroform, dichlorethylene (boiling point about 55° C.), ethylenechlorid ("Dutch liquid") (boiling point about 84° C.), said solvents being used alone, or mixed, or in conjunction with varying proportions of benzol or its homologs or other suitable hydrocarbons. For many purposes, as more fully explained below, preference is given to those solvents which have a boiling-point exceeding that of water.

For the preparation of compositions intended for electrical insulation it is well to observe the precaution of freeing the fusible phenolic resin from any considerable excess of phenol or cresol by washing with water, steaming, or otherwise, and then rendering it quite anhydrous by sufficient heating.

The proportion of anhydro-formaldehyde-anilin used exerts a profound influence upon the character of the condensation product, and this proportion may therefore be widely varied according to the nature of the product desired. Condensation products containing up to 20 parts by weight of anhydro-formaldehyde-anilin to 100 parts of the fusible phenol resin are in general permanently fusible. The higher proportions of anhydro-formaldehyde-anilin, up to 200 parts by weight for 100 parts of the fusible phenolic resin, yield products which ultimately become infusible under continued heating. The hardness of these infusible products tends to increase up to about 110 to 130 parts of anhydro-formaldehyde-anilin to 100 parts of the fusible phenolic resin, while products prepared with still higher proportions of anhydro-formaldehyde-anilin, show increased plasticity at higher temperatures.

The resistance of the infusible products to the action of such chemicals as alcohol, acetone and dilute caustic soda, increases with the proportion of anhydro-formaldehyde-anilin used. For example, products containing from 150 to 200 parts of anhydro-formaldehyde-anilin to 100 parts of fusible phenolic resin, were not apparently acted upon by 10% caustic soda solutions, or by methyl alcohol, after eleven days at room temperatures, and were only slightly softened by acetone.

It is to be understood that modifications of my method which involve the formation in the solvent of the anhydro-formaldehyde-anilin, or of the fusible phenolic resin, or both, from their components, are within the scope of my invention. Such methods I now regard as less desirable than the direct method above described, according to which the pre-formed fusible phenolic resin and anhydro-formaldehyde-anilin are incorporated with the solvent, separately or after being sintered or melted together or combined by heat.

My invention is not restricted to the use of the solvents above mentioned as particularly desirable for purposes of electrical insulation, for I may employ various solvents or mixtures of solvents according to the use for which the composition is designed. Among such uses are:—

The impregnation, filling or coating of coils, for electrical purposes, and the insulation of electrical conductors;

The impregnation of wood, paper, wood-pulp, cement, porous stone and other porous materials;

The coating of paper and the preparation of composite cardboard;

The preparation of putties, cements, and analogous compositions;

The preparation of protective enamels, coatings, varnishes, paints, lacquers and the like;

The manufacture of molding mixtures and molded articles.

For the impregnation of coils, the manufacture of putties and cements, and other uses in which it is desired that little or no evaporation should occur, it is desirable to select a solvent of which the boiling-point is sufficiently high to permit the reaction whereby the product is transformed to its infusible state, to occur without the solvent being expelled. Typical solvents of this class are neutral oil and mono-chlor-naphthalene. Heat should be applied to obtain complete solution. About equal parts by weight of condensation product and one of the above solvents, give a composition of about the required consistency for most purposes, although these proportions may be altered considerably to meet the particular requirements. Greater or lesser amounts of any of the more readily volatile auxiliary solvents may be added, the high-boiling solvent constituting, however, the main part of the solvent. Solutions containing about 50% by weight of neutral oil or mono-chlornaphthalene will gelatinize to an elastic, infusible mass if heated for about 10 hours at about 110° to 115° C.; further heating at these or somewhat higher temperatures, renders the mass still firmer and harder.

When varnishes, paints and lacquers are to be prepared, the solvent should possess sufficient volatility to permit ready drying; and when the varnish is to be applied for electrical insulation, the solvent should possess the characteristics above set forth. Typical solvents for such uses are ethylene-chlorid (boiling point about 84° C.), dichlorethylene (boiling point about 55° C.), and chloroform, used alone or mixed, or suitably diluted with benzol.

If symmetrical dichlorethane ("Dutch liquid," chlorid of ethylene) be used as a solvent, it can be diluted with as much as three or four times its own volume of benzol. Chloroform can stand an addition of about an equal volume of benzol, dichlorethylene, about two volumes, and tetrachlorethane about two to three volumes. Toluene can be used as a diluent only in smaller proportions than benzol.

Satisfactory solutions, applicable for use as varnishes or lacquers, or when mixed with suitable pigments as vehicles for paints, may be prepared by compounding, with aid of heat if necessary, approximately equal amounts of solvent and solute; for example, if chlorid of ethylene (symmetrical dichlorethane or "Dutch liquid") and the above condensation product, prepared with anhydro-formaldehyde-anilin, while it is yet in its soluble condition, be compounded in about equal proportions by weight, the resulting solution can be diluted as above indicated, as may be required for particular uses, or more concentrated or thickened solutions may be prepared if required.

My invention is not restricted to the use, in conjunction with a solvent of high insulating value, of the above-described condensation product of phenolic bodies and anhydro-formaldehyde-anilin, inasmuch as it is, so far as I am aware, broadly new to provide a solution in a solvent of such high insulating value as is herein contemplated, of any initial phenolic condensation product which is capable of transformation by simple heating into an infusible body. I am aware that it has been alleged that such condensation products may be dissolved in benzol, toluol, or mono-chlor-naphthalene, but I have found that this solution is dependent upon the presence of considerable proportions of free phenols, or nitrobenzol, or acetone or other ketones, alcohol, esters, or similar auxiliary solvents, which greatly reduce the availability of the resulting solution for purposes of electrical insulation.

In the preparation of industrial products and compositions consisting of or containing the compositions above described it is to be understood that I may incorporate such substances, as for example those of a fibrous or cellular nature, or powdered fillers or substances forming solid solutions, as are desirable for particular purposes; heat and pressure to any required degree may be employed for hardening or molding operations; and in general I may apply such manipulations and devices and provide such additions as are now used in this art.

Where reference is made to a solvent of the "hydrocarbon type" it is intended thereby to include as equivalents in the composition, chlorin substitution products of the class mentioned herein as suitable solvents, as well as neutral oil and equivalent hydrocarbons or hydrocarbon mixtures.

I do not claim specifically in this application the aforesaid reaction product in conjunction with a chlorinated-hydrocarbon solvent, such subject-matter being claimed in my divisional application, Serial No. 4554, filed January 26, 1915.

The expression "product resulting from the reaction of phenols and anhydro-formaldehyde-anilin" as used herein, is intended to include products formed by the direct reaction of phenolic bodies or of fusible phenolic resins with pre-formed or dry anhydro-formaldehyde-anilin, and also similar products produced by the reaction of phenolic bodies or of fusible phenolic resins with anilin and formaldehyde, or with substances equivalent to these in the reaction.

The expression "an initial phenolic condensation product capable of transformation by simple heating into an infusible body" is used herein to designate those phenolic condensation products which, as above described, are directly transformed by heat into infusible bodies without addition of formaldehyde or other body containing a mobile methylene group.

I claim:—

1. An electrical insulating composition comprising an initial phenolic condensation product capable of transformation by simple heating into an infusible body, and a solvent therefor, said solvent being of the hydro-carbon type, and characterized by its high insulating value, its immiscibility with water, and its capability of dissolving the said initial condensation product after the same has been substantially freed from uncombined phenols.

2. An electrical insulating composition comprising an initial phenolic condensation product capable of transformation by simple heating into an infusible body, and a solvent therefor, said solvent being of the hydro-carbon type, and characterized by its high insulating value, its immiscibility with water, and its capability of dissolving the said initial condensation product after the same has been substantially freed from uncombined phenols, and having a boiling point exceeding that of water.

3. An electrical insulating composition comprising an initial phenolic condensation product capable of transformation by simple heating into an infusible body, and a solvent therefor, containing neutral oil.

4. A composition comprising an amorphous product resulting from the reaction of phenols and anhydro-formaldehyde-anilin, said product being free from uncombined formaldehyde and capable of transformation by simple heating into an infusible body and an organic solvent therefor.

5. A composition comprising an amorphous product resulting from the reaction of phenols and anhydro-formaldehyde-anilin and an organic solvent therefor, said solvent being of the hydro-carbon type, and characterized by its high insulating value, its immiscibility with water, and its capability of dissolving the said initial condensation product, after the same has been substantially freed from uncombined phenols.

6. A composition comprising an amorphous product resulting from the reaction of phenols and anhydro-formaldehyde-anilin and an organic solvent therefor, said solvent being of the hydro-carbon type, and characterized by its high insulating value, its immiscibility with water, and its capability of dissolving the said initial condensation product, after the same has been substantially freed from uncombined phenols, and having a boiling point exceeding that of water.

7. A composition comprising an amorphous product resulting from the reaction of phenols and anhydro-formaldehyde-anilin, transformable by simple heating into an infusible body, and an organic solvent therefor.

8. A composition comprising an amorphous product resulting from the reaction of phenols and anhydro-formaldehyde-anilin, transformable by simple heating into an infusible body, and an organic solvent therefor, said solvent being of the hydro-carbon type, and characterized by its high insulating value, its immiscibility with water, and its capability of dissolving the said initial condensation product, after the same has been substantially freed from uncombined phenols.

9. A composition comprising an amorphous product resulting from the reaction of phenols and anhydro-formaldehyde-anilin, transformable by simple heating into an infusible body, and an organic solvent therefor, said solvent being of the hydro-carbon type, and characterized by its high insulating value, its immiscibility with water, and its capability of dissolving the said initial condensation product, after the same has been substantially freed from uncombined phenols, and having a boiling point exceeding that of water.

10. An electrical insulating composition comprising a reaction product of phenols and anhydro-formaldehyde-anilin and neutral oil.

In testimony whereof I affix my signature in presence of two witnesses.

LEO H. BAEKELAND.

Witnesses:
AUGUST GOTTHELF,
MARY E. SCHOLDING.